United States Patent [19]

Horiuchi et al.

[11] Patent Number: 5,896,464

[45] Date of Patent: Apr. 20, 1999

[54] RULED LINE ELIMINATION APPARATUS AND METHOD

[75] Inventors: Hideo Horiuchi; Yoshimasa Iwata; Takeshi Mishima, all of Tokyo, Japan

[73] Assignee: Kabushiki Kaisha Toshiba, Kanagawa, Japan

[21] Appl. No.: 08/771,055

[22] Filed: Dec. 20, 1996

[30] Foreign Application Priority Data

Dec. 28, 1995 [JP] Japan ................................. 7-352144

[51] Int. Cl.$^6$ ............................................. G06K 9/34
[52] U.S. Cl. ........................... 382/178; 382/173; 382/177; 382/282; 382/283; 707/510; 358/482
[58] Field of Search ............................. 382/173, 177, 382/178, 282, 283; 707/510; 358/482

[56] References Cited

U.S. PATENT DOCUMENTS

| 4,850,726 | 7/1989 | Kimura et al. ................. 400/279 |
|---|---|---|
| 5,101,448 | 3/1992 | Kawachiya et al. ............... 382/61 |
| 5,191,612 | 3/1993 | Katsuyama et al. .............. 382/9 |
| 5,235,653 | 8/1993 | Nakano et al. .................. 382/61 |
| 5,530,561 | 6/1996 | Shimazaki ....................... 358/455 |
| 5,668,892 | 9/1997 | Itonori .......................... 382/177 |

OTHER PUBLICATIONS

Nobuyuki Otsu, "An Automatic Threshold Selection Method Based on Discriminant and Least Squares Critena", Proc. of the Institute of Electronics . . . , vo. J63–DNo. 4, pp. 349–356, 1980.

Nobuyuki Otsu, "A Threshold Selection Method from Gray-Level Histograms", IEEE Trans. on Systems . . . , Vo. SMC–9 No. 1, Jan. 1979, pp. 62–66.

*Primary Examiner*—Leo H. Boudreau
*Assistant Examiner*—Kanji Patel
*Attorney, Agent, or Firm*—Graham & James LLP

[57] ABSTRACT

In the ruled line elimination apparatus of the present invention, the ruled line contacting a character or overlapping to the character is completely eliminated. First, a ruled line determination section determines existence area of the ruled line in the input image. Second, a ruled line elimination section determines continuous pixels consisting of the ruled line in the existence area, and eliminates the continuous pixels by unit of predetermined width, in which a direction of the predetermined width is perpendiculer to a directed of the ruled line.

39 Claims, 19 Drawing Sheets

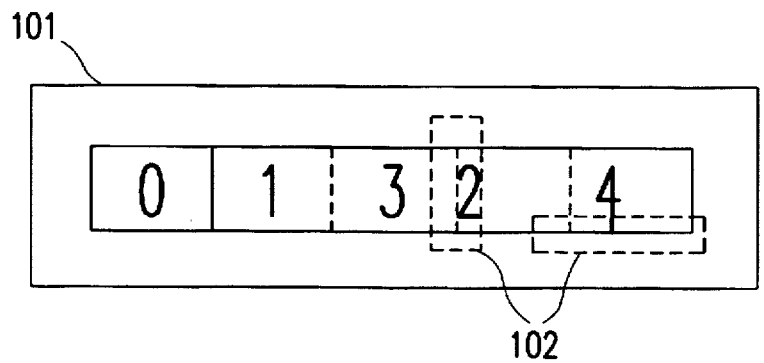
FIG. 8
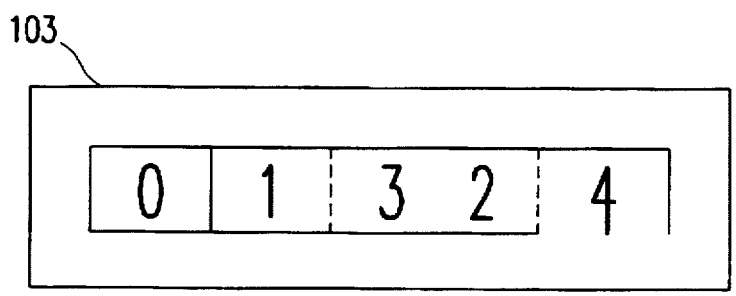
FIG. 9A
0  1  3  2  4 ⌐ 104
FIG. 9B
⌐0⌐ ⌐1⌐ ⌐3⌐ ⌐2⌐ ⌐4⌐ — 105
FIG. 9C ⊕⊕ : RULED LINE ELIMINATION MASK
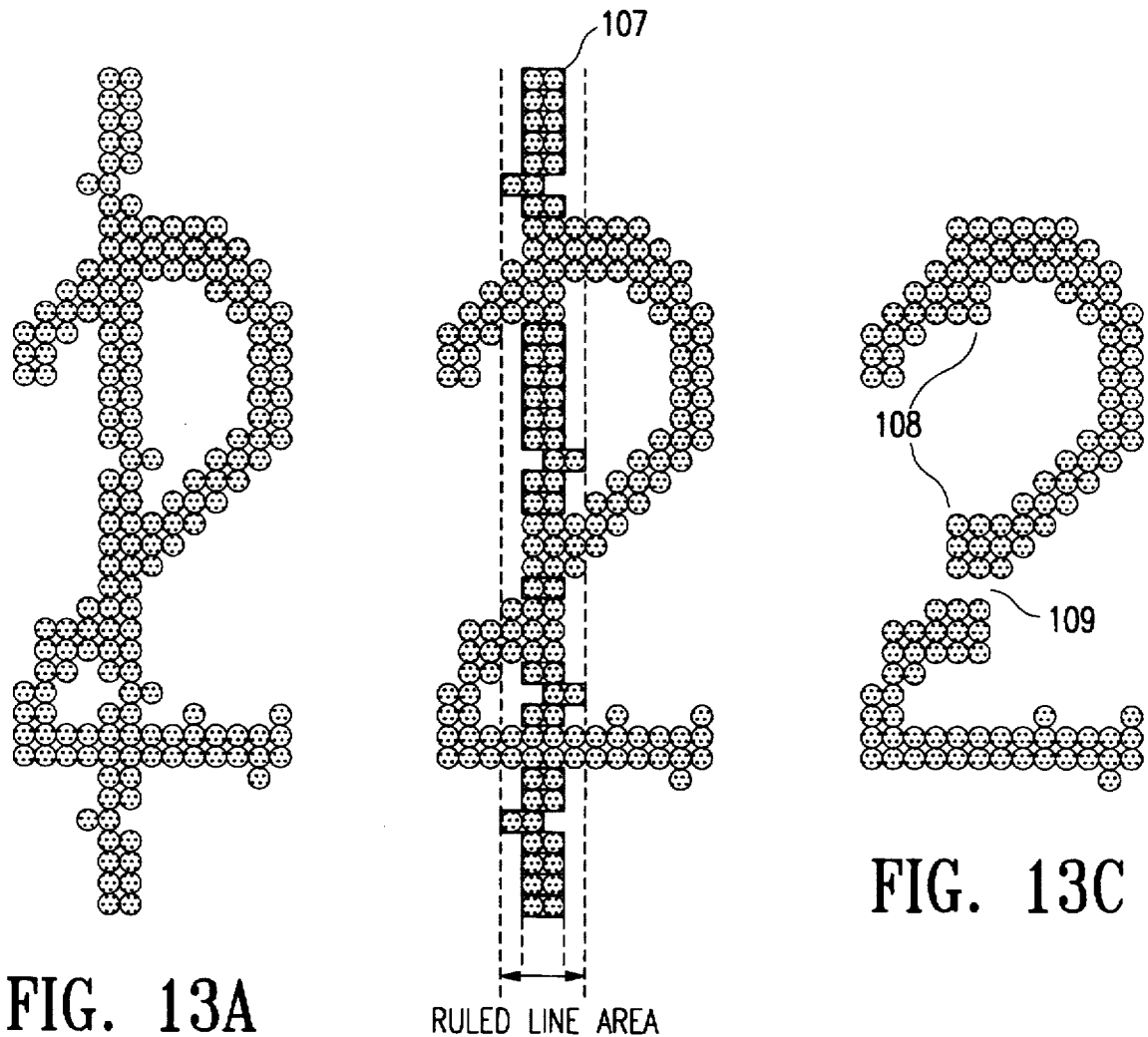
FIG. 13A
RULED LINE AREA
FIG. 13C
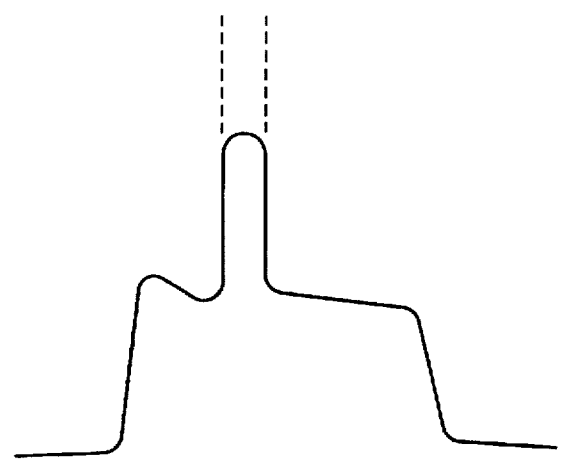
FIG. 13B

⊞ : RULED LINE ELIMINATION MASK

⊕ : CUT POINT

● : BLACK PIXEL (NON-ELIMINATED)

RULED LINE AREA

⊕: CUT POINT
( L1~L6 : LEFT SIDE CUT POINT )
( R1~R6 : RIGHT SIDE CUT POINT )

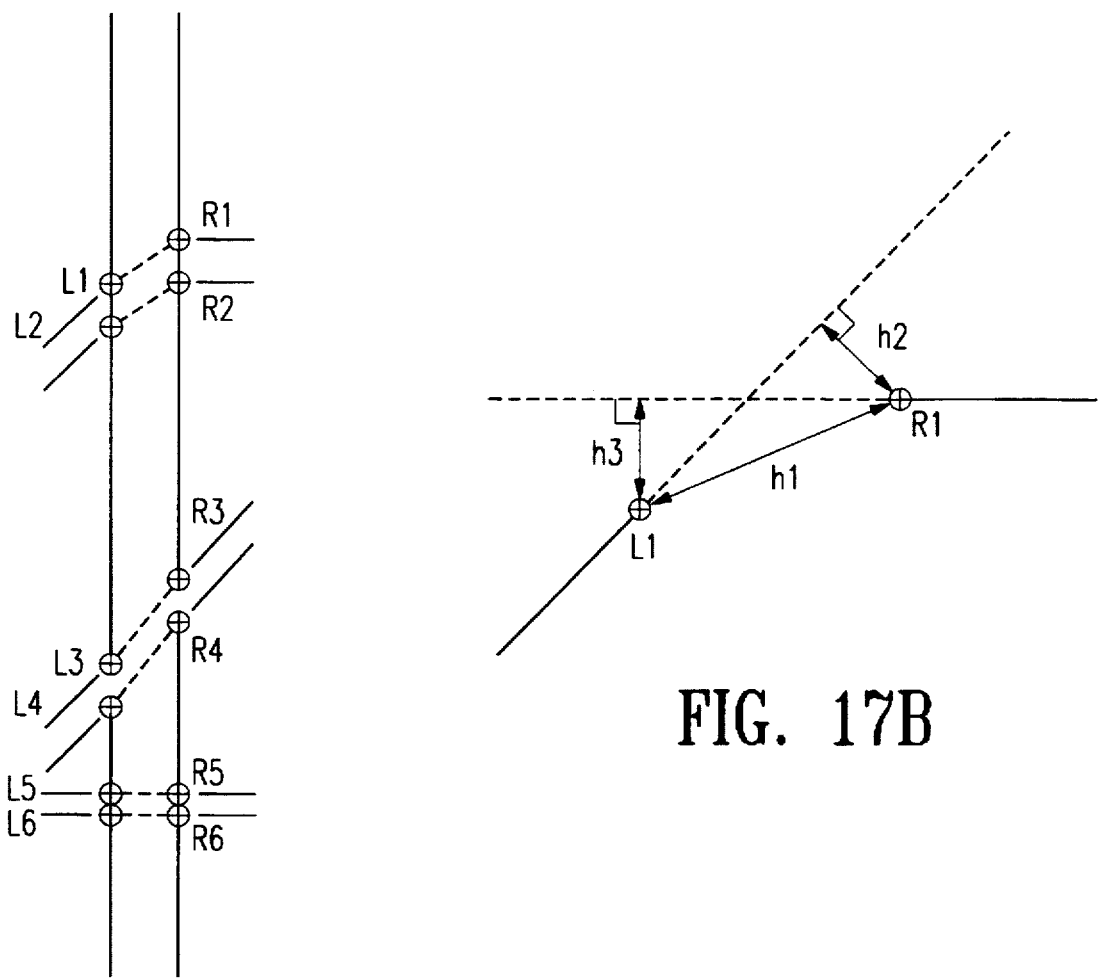
FIG. 17B
FIG. 17A
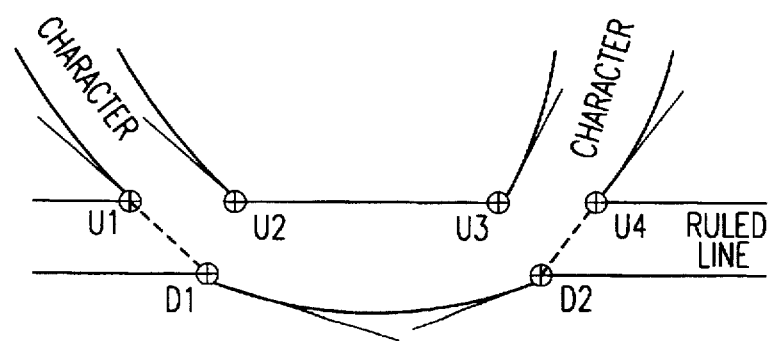
FIG. 17C

RULED LINE ELIMINATION APPARATUS AND METHOD

BACKGROUND OF THE INVENTION

1. Field of the Invention

The present invention relates to a ruled line elimination apparatus and method for eliminating the ruled line from an input image of a form in which the ruled line contacts or overlaps character.

2. Description of the Related Art

An optical character reader (OCR) can read characters in an entry item printed by dropout-colour on a form. Recently, various kinds of forms are easily created, and the form in which the entry item is printed by non-dropout-colour is used. Such forms have many uses including government forms, bank forms, or various applications. The forms may contain character boxes or ruled lines in known locations. A person filing out the form should enter all characters within the ruled lines. Sometimes the characters are not all within the ruled line.

Therefore, the need to recognize the characters in the entry item of non-dropout-colour increases. An OCR which recognizes the characters in the entry item of non-dropout-colour must eliminate the ruled line of the entry item and extract the characters only when the characters overlap the ruled line. One method is disclosed in Japanese Patent Publication (Kokoku)No.6-97471. In this method, as for input image in which a character "5" contacts with the entry frame or ruled line as shown in FIG. 1, the entry frame is cut along a boundary line inside the entry frame and the entry frame is eliminated as shown in FIG. 2A.

Alternatively, the entry frame is cut by extending a line outside the boundary line from the cut begining point to the end point, and the entry frame is eliminated as shown in FIG. 2B. However, in this method, if the entry frame of one side overlaps the character at three parts (or more than three) as shown in FIG. 3A, the entry frame is not eliminated completely as shown in FIG. 3B. In this case, the character is extracted while the ruled line is added to the character.

In this method, if the character "8" overlaps plural sides of the entry frame as shown in FIG. 4, plural images of the character in which the rule line is eliminated are extracted as shown in FIG. 5. These are image candidates to be recognized. However, character recognition includes a large number of calculation quantity. Therefore, a large number of calculation time is necessary to recognize many candidates.

Furthermore, in FIG. 3B, it often happens that the character "2" is mistakenly recognized as "8" because the ruled line is added to the character. In FIG. 5, in case plural image candidates are recognized, possibility for mistaken-recognition increases.

On the other hand, as a method to eliminate the ruled line from the multivalued image, the character and the ruled line are binarized to separate each other by threshold using density difference between the character and the ruled line, and pixels corresponding to density of the ruled line are eliminated from the multivalued image. This method is disclosed in "An Automatic Threshold Selection Method Based on Discriminant and Least Squares Criteria", '80/4 vol.J63-D,No.4, pp.349–356, THE TRANSACTIONS OF THE INSTITUTE OF ELECTRONICS, INFORMATION AND COMMUNICATION ENGINEERS. However, in this method, in case the density difference between the character and the ruled line is small value, the character is not separated from the ruled line completely.

SUMMARY OF THE INVENTION

It is an object of the present invention to provide a ruled line elimination apparatus and method to completely eliminate the ruled line from the binary image or the multivalued image in which the ruled line contacts with or overlaps to the character.

According to the present intention, there is provided a ruled line elimination apparatus for eliminating a ruled line from an input image including characters and the ruled line, comprising: determination means for determining an existence area of the ruled line in the input image; and elimination means for eliminating continuous pixels in the existence area using a mask having a predetermined width perpendicular to the ruled line.

Further in accordance with the present invention, there is provided a ruled line elimination apparatus for eliminating a ruled line from an input image including characters and the ruled line, comprising: determination means for determining an existence area of the ruled line in the input image; and elimination means for cutting the ruled line along a direction of a boundary line of the character extending from the existence area to outside of the ruled line and for eliminating continuous pixels in the existence area of the cutted-ruled line using a mask having a predetermined width perpendicular to the ruled line.

Further in accordance with the present invention, there is provided a ruled line elimination apparatus for eliminating a ruled line from a maltivalued input image comprised of pixels, the image including characters and the ruled line, comprising: set means for setting a plurality of threshold values along a direction perpendicular to a direction of the ruled line in the input image, wherein the threshold value of the ruled line is higher than the threshold value of other areas in the input image; and elimination means for comparing a pixel value with the threshold value of the ruled line, and for eliminating the pixel from the input image if the pixel value is higher than the threshold value of the ruled line.

Further in accordance with the present invention, there is provided a ruled line elimination apparatus for eliminating a ruled line from an input image including characters and the ruled line, comprising: decision means for deciding a kind of the input image selection means for selecting a program of elimination for a binary image or a program of elimination for a multivalued image in accordance with the kind of the input image; and elimination means for eliminating the ruled line in the input image in accordance with the selected program of elimination.

BRIEF DESCRIPTION OF THE DRAWINGS

FIG. 8 is a schematic diagram of an example of input image including the character and the ruled line.

FIGS. 9A, 9B, 9C are schematic diagrams of an image in which the ruled line is partially eliminated, the characters are extracted, and the result is recognized.

FIG. 13A is a schematic diagram of pixel image in which the ruled line overlaps the character.

FIG. 13B is a schematic diagram of the pixel image in which the ruled line position is estimated by projection and the ruled line elimination mask is scanned.

FIG. 13C is a schematic diagram of the pixel image in which the ruled line is eliminated according to the first embodiment.

FIGS. 17A, 17B, and 17C are schematic diagrams of an example of a pair of cut points, an example of distance between two cut points and another example of a pair of cut points respectively.

DETAILED DESCRIPTION OF THE PREFERRED EMBODIMENTS

The embodiments of the present invention are described below with reference to the drawings.

Figure 1:
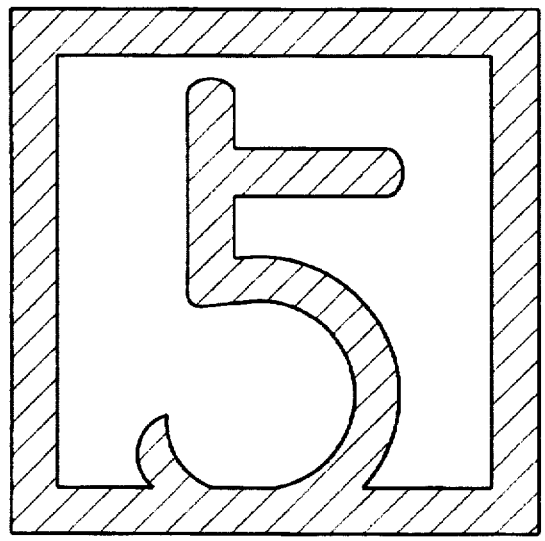
FIG. 1 is a schematic diagram of an image in which a character contacts with a ruled line.
Figure 2A:
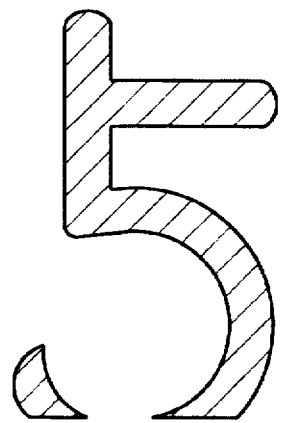
FIGS. 2A and 2B are schematic diagrams of images in which the ruled line is eliminated according to the prior art.
Figure 2B:
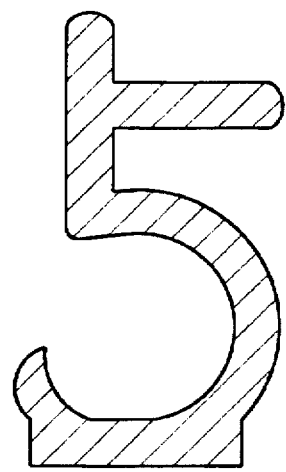
Figure 3A:
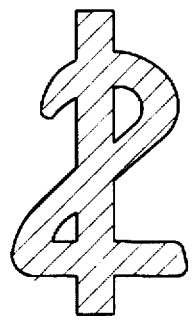
FIGS. 3A and 3B are schematic diagrams of images in which the ruled line of one side overlaps the character at plural parts.
Figure 3B:
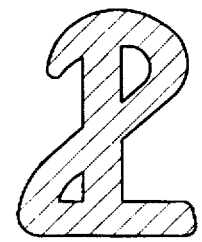
Figure 4:
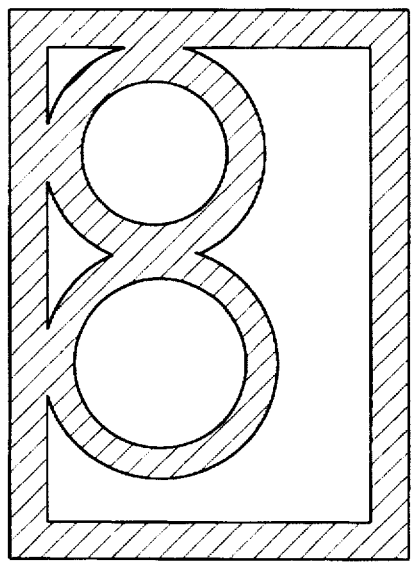
FIG. 4 is a schematic diagram of an image in which a ruled line of two sides contacts with the character.
Figure 5:
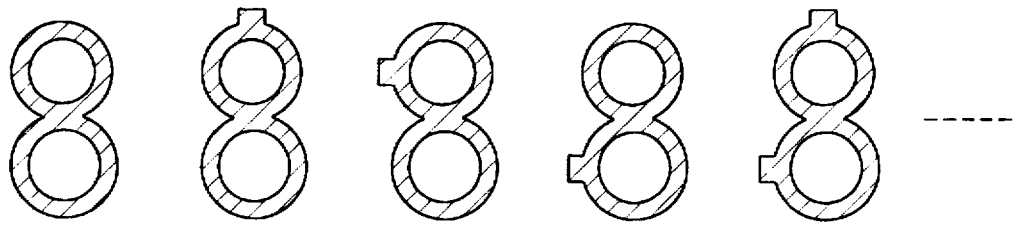
FIG. 5 is a schematic diagram of images of plural candidates which the character is extracted according to prior art.
Figure 6:
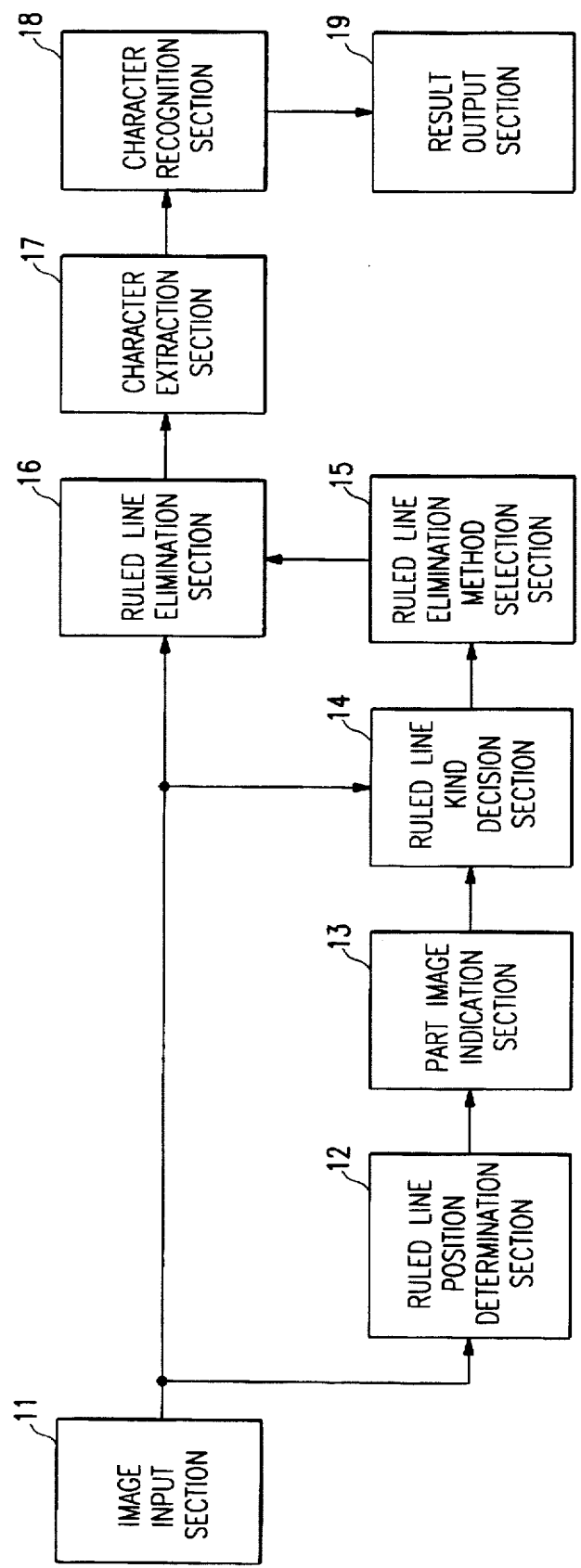
FIG. 6 is a block diagram of the ruled line elimination apparatus according to a first embodiment of the present invention.

FIG. 6 is a block diagram of an OCR to which the ruled line elimination apparatus of the present invention is applied. The OCR is comprised of an image input section 11, a ruled line position determination section 12, a part image indication section 13, a ruled line kind decision section 14, a ruled line elimination method selection section 15, a ruled line elimination section 16, a character extraction section 17, a character recognition section 18, and a result output section 19. The image input section 11 is, for example, a scanner to input form image of recognition object. The ruled line position determination section 12 determines the ruled line position in the input image supplied by the image input section 11. The part image indication section 13 indicates position of part image including the ruled line to be eliminated according to the ruled line position. The ruled line kind decision section 14 decides the kind of the ruled line of the part image indicated by the part image indication section 13. The ruled line elimination method selection section 15 selects program of the ruled line elimination method suitable for the kind of the ruled line. The ruled line elimination section 16 equips processing function of the ruled line elimination for plural kinds of methods, and eliminates the ruled line from the input image according to the program of the method selected by the ruled line elimination method selection section 15. The character extraction section 17 extracts the character part from the input image in which the ruled line is eliminated by the ruled line elimination section 16. The character recognition section 18 recognizes the character extracted by the character extraction section 17. The result output section 19 outputs the recognition result through display or hard copy.

Figure 7:
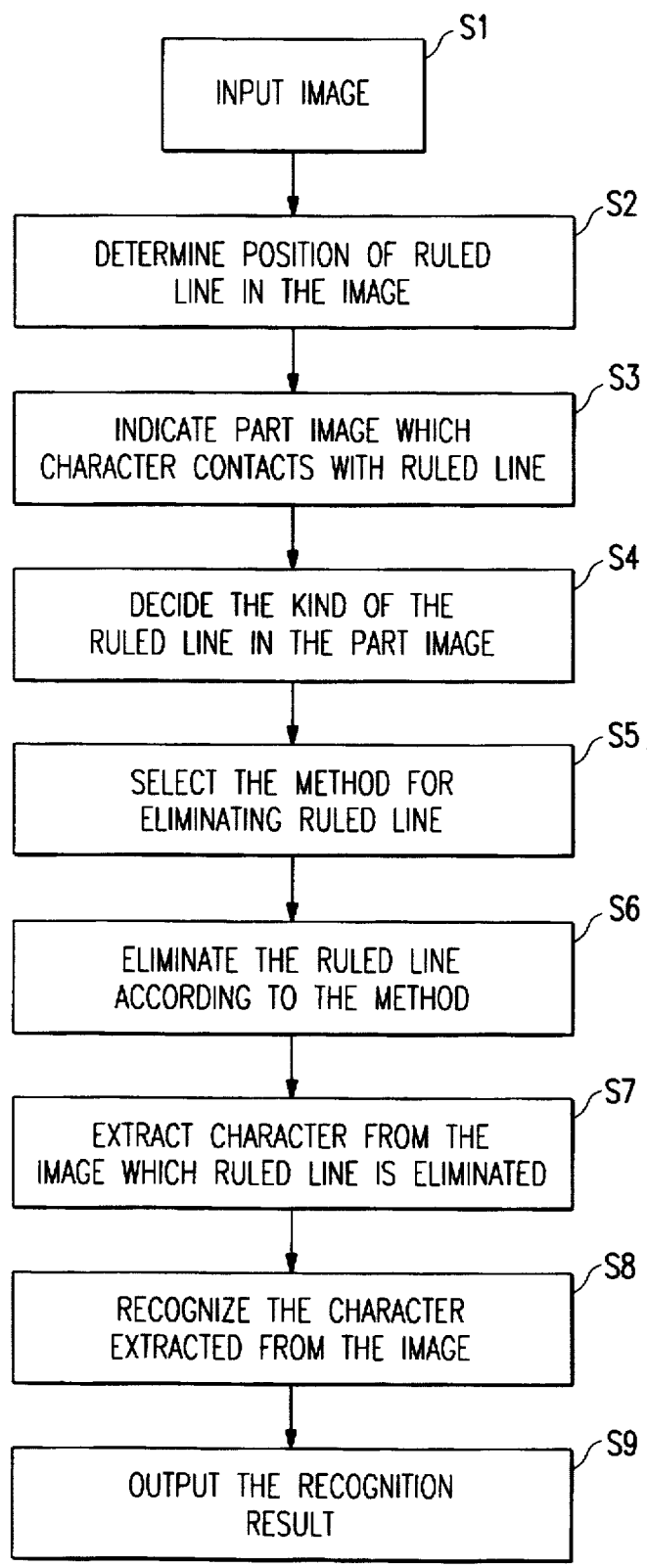
FIG. 7 is a flow chart of processing of the ruled line elimination method according to the first embodiment of the present invention.

FIG. 7 is a flowchart of processing of the ruled line elimination method according to the first embodiment. First, the image of the form is inputted by the image input section 11 (step SI). FIG. 8 is an example of the input image. The input image 101 is either a binary image or a multivalued image. Next, the ruled line position of the input image is determined by the ruled line position determination section 12 (step 2). The determination of the ruled line includes processing of determination of the ruled line width. In case the ruled line position of the form is predetermined, the position is determined using the information. In case the input image is the binary image, the ruled line position is determined by distribution situation of black pixels. In case the input image is the multivalued image, the ruled line position is determined by Hough conversion and projection using differential calculus mask.

Next, the part image indication section 13 indicates position of part image 102 including the ruled line to be eliminated (step S3): Concretely speaking, in the input image 101 shown in FIG. 8, lines consisting of character frame are scanned at predetermined width by the user and the ruled line contacting with the character is indicated by the part image 102.

The ruled line kind decision section 14 decides kind of the ruled line in the part image 102 (step S4). The kind of the ruled line includes a solid line and a dotted line. If the kind of form is previously determined, the kind of the ruled line is decided using information of the kind of form. If the kind of form is not previously determined, the ruled line is scaned along direction of the ruled line. For example, the number of times which density changes largely is counted for the multivalue image and the number of times which white pixel changes black pixel is counted for the binary image. In case the number of times is above threshold, the ruled line is decided to be the dotted line. In case the number of times is not above threshold, the ruled line is decided to be the solid line. Next, the ruled line elimination method selection section 15 selects program of the ruled line elimination method according to the kind of the image and the kind of the ruled line (step S5). The ruled line contacting with the character is eliminated by the program selected by the ruled line elimination method selection section 15 (step S6).

As a result, the image 103 in which the ruled line is eliminated is outputted as shown in FIG. 9A. The character extraction section 17 extracts the character by processing of labeling to the image 103 (step S7). The label except for the ruled line is outputted as extracted character 104 shown in FIG. 9B. The character recognition section 18 recognizes the extracted character 104 (step S8). The recognition result 105 is outputted through the result output section 19 as shown in FIG. 9c (step S9).

Figure 10:
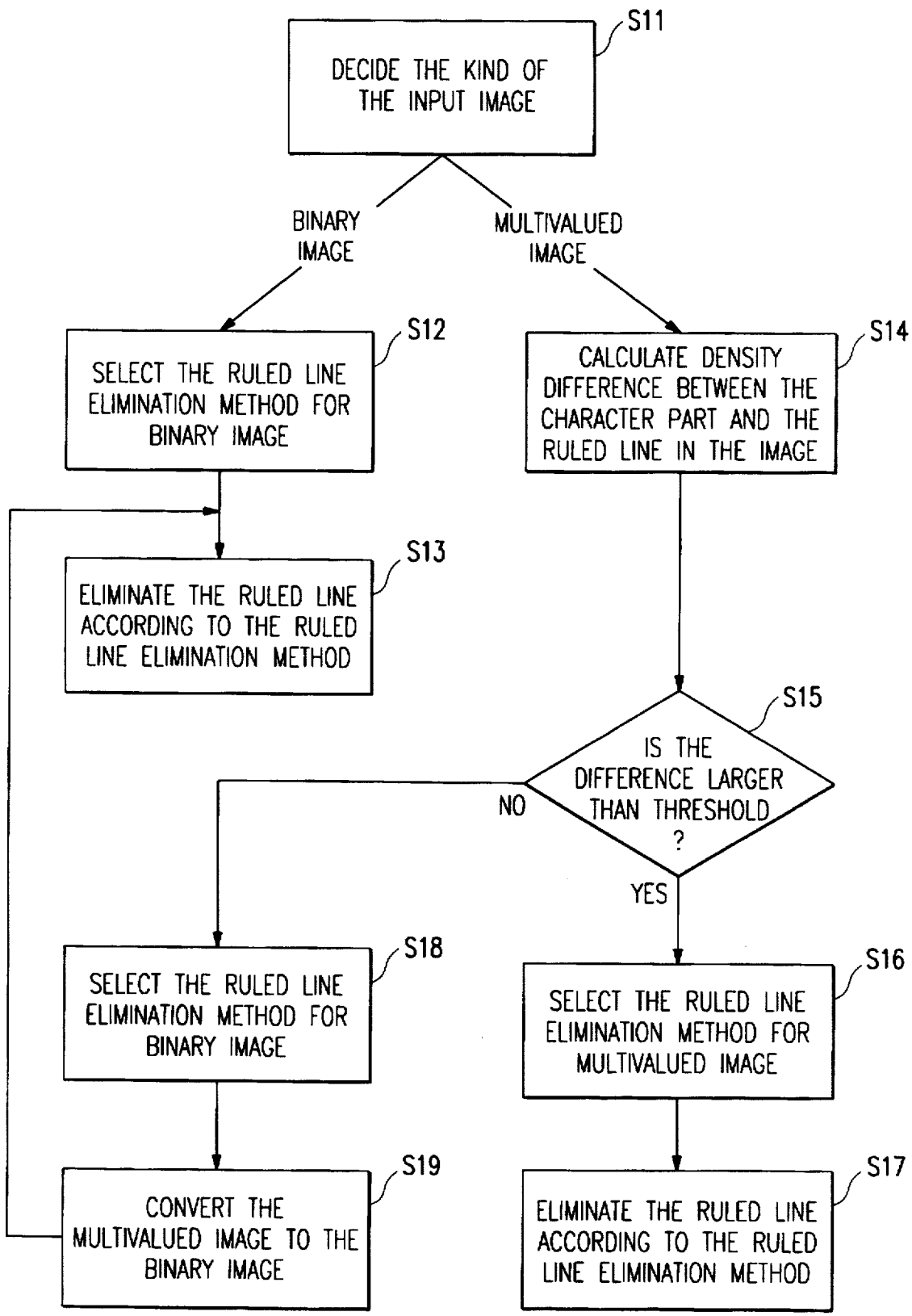
FIG. 10 is a flow chart of processing for selecting the ruled line elimination method according to the present invention.

Next, the functional construction of the ruled line kind decision section 14, the ruled line elimination method selection section 15 and the ruled line elimination section 16 shown in FIG. 6 is explained. FIG. 10 is a flow chart of processing of decision of selecting the ruled line method. First, the ruled line kind decision section 14 decides whether the input image is the binary image or the multivalued image using prior method (step S11). If the input image is the binary image, the ruled line elimination method selection section 15 selects program of the ruled line elimination method for binary image (step S12) and sends the program to the ruled line elimination section 16. The rule line elimination section 16 eliminates the ruled line in the binary image according to the program (step S13). If the input image is the multivalued image, the ruled line kind decision section 14 calculates density difference between the character and the ruled line in the multivalued image (step S14). If the difference is larger than a threshold (step S15), the ruled line elimination method selection section 15 selects program of the ruled line elimination method for the multivalued image (step S16) and sends the program to the ruled line elimination section 16 (step S16). The ruled line elimination section 16 eliminates the ruled line from the multivalued image according to the program (step S17). If the difference is not larger than the threshold, the ruled line elimination method selection section 15 selects program of the ruled line elimination method for the binary image (step S18). This program and conversion indication signal are outputted to the ruled line elimination section 16. The ruled line elimination section 16 converts the multivalued image to the binary image using binary threshold "0.5" according to the convert indication signal (step S19), and eliminates the ruled line from the binary image according to the program (step S13).

Figure 11:
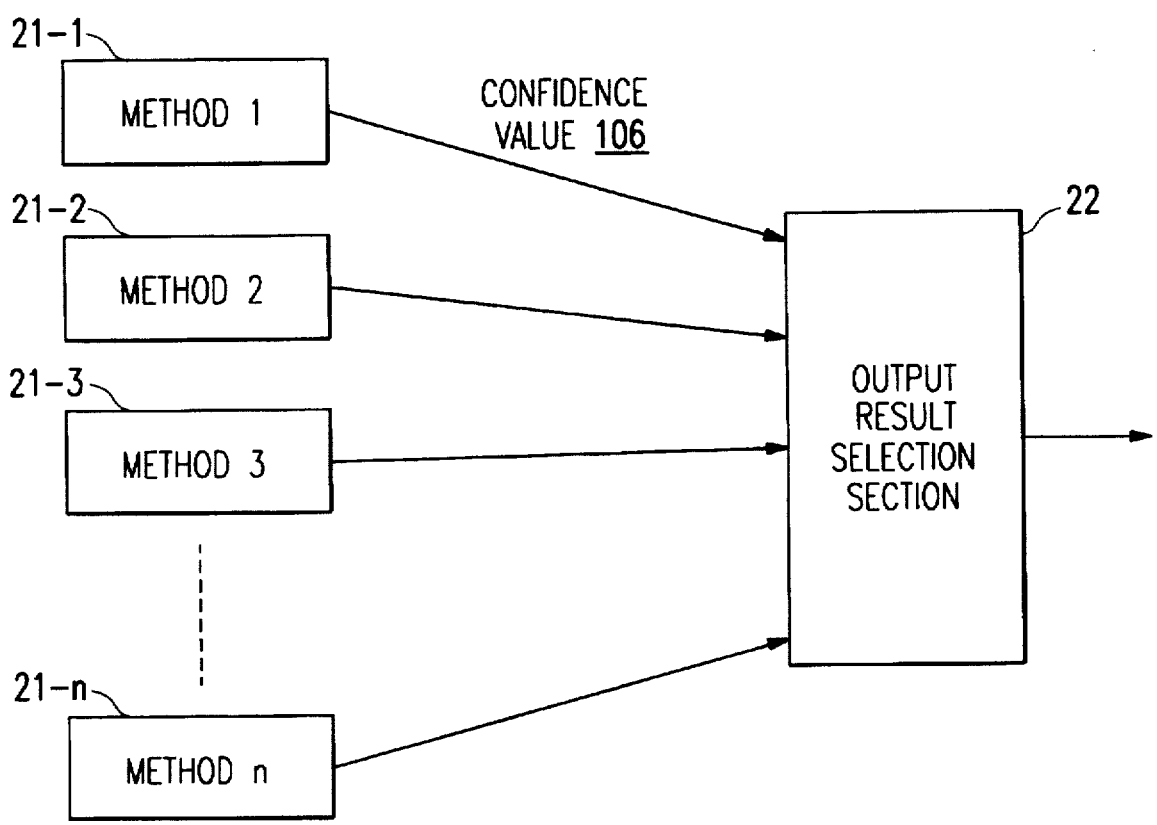
FIG. 11 is a block diagram of functional construction of the ruled line elimination method selection section and the ruled line elimination section.

FIG. 11 is a block diagram of second functional construction of the ruled line elimination method selection section 15 and the ruled line elimination section 16. The ruled line elimination section 21-1, . . . ,21-n equips n-kinds of programs of the ruled line elimination method respectively. Each ruled line elimination section 21-1, . . . ,21-n eliminates the ruled line from the input image respectively and outputs the elimination result with confidence value 106 to an output result selection section 22. The confidence value 106 represents quantity of the ruled line eliminated sufficiently. For example, in the multivalued image, separation degree between the ruled line and the character corresponds to the confidence value. The output result selection section 22 selects one elimination result whose confidence value is largest among all confidence values.

Figure 12:
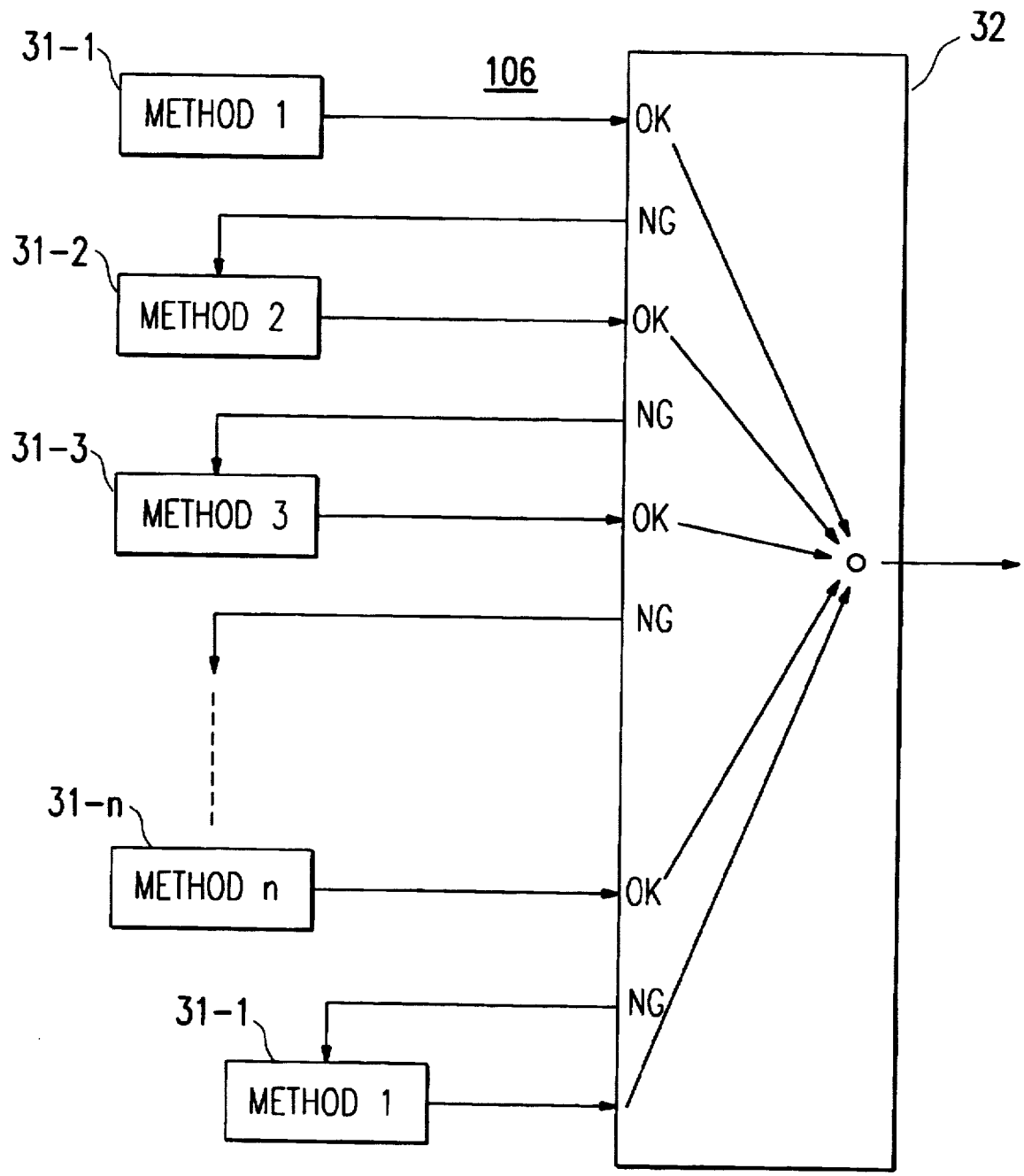
FIG. 12 is a block diagram of another functional construction of the ruled line elimination method selection section and the ruled line elimination section.

FIG. 12 is a block diagram of third functional construction of the ruled line elimination section 15 and the ruled line elimination section 16. The ruled line elimination section 31-1, . . . ,31-n equips n-kinds of programs of the ruled line elimination method respectively. The ruled line elimination section 31-1 equips program whose efficiency to eliminate the ruled line is highest, and the ruled line elimination section 31-n equips program whose efficiency to eliminate the ruled line is lowest. In short, the ruled line elimination sections 31-1, . . . ,31-n are arranged in order of efficiency to eliminate the ruled line. First, the ruled line elimination section 31-1 eliminates the ruled line from the input image and outputs the elimination result with the confidence value 106 to the output result selection section 32. If the confidence value is higher than a threshold, the output result selection section 32 selects the elimination result. If the confidence value is not higher than the threshold, the ruled line elimination section 31-2 eliminates the ruled line from the input image. In this way, in case the confidence value satisfies the condition, the elimination result is selected and the elimination processing finishes. In case the confidence value does not satisfy the condition, elimination processing is repeated by next ruled line elimination section. In case all confidence value of all ruled line elimination sections do not satisfy the condition, the elimination result of the ruled line elimination section 31-1 is selected.

In the processing of FIG. 10, in case the input image is the binary image, the ruled line elimination method for the binary image [I] or [II] explained later is used. In case the input image is the multivalued image, the ruled line elimination method for the multivalued image explained later is used.

(1) the ruled line elimination method for the binary image [I]

In this method, existence area of the ruled line is determined in the input image. As for the ruled line in the existence area, continuous black pixels area whose direction is perpendicular to direction of the ruled line is masked by predetermined width corresponding to the ruled line width. In short, the black pixels corresponding to the ruled line width is eliminated from the continuous black pixels area.

[step 1]: determination of the ruled line position

As shown in FIG. 13A, when the pixel image including the character and the ruled line, black pixels of the character and the ruled line are projected in the direction of the ruled line as shown in FIG. 13B. The estimated width V of the ruled line is determined according to the projection figure (in FIG. 13B, V=2). Then, left edge and right edge of the ruled line width is extended as W pixels (in FIG. 13B, W=1) as the ruled line area.

[step 2]: elimination of the ruled line

The ruled line area is scanned by ruled line elimination mask 107 of width V. Continuous black pixels whose direction is perpendicular to direction of the ruled line in the ruled line area is eliminated by unit of 1 line. As a result, the character part in which the ruled line is eliminated is extracted as shown in FIG. 13C. However it often happens that the character includes salient part 108 and broken part 109.

(2) the ruled line elimination method for the binary image [II]

In the method [II], after the ruled line area is determined, the ruled line is cut along direction of boundary line of the character part extended from the ruled line area. Then, the continuous black pixels whose direction is perpendicular to direction of the ruled line in the ruled line area are eliminated by unit of 1 line in same way as method [I].

The white pixels corresponding to cut point in the ruled line are changed to the black pixels. As a result, the character part which does not include the salient part 108 and the broken part 109 is extracted.

[step 1]: determination of the cut point

Figure 14A:
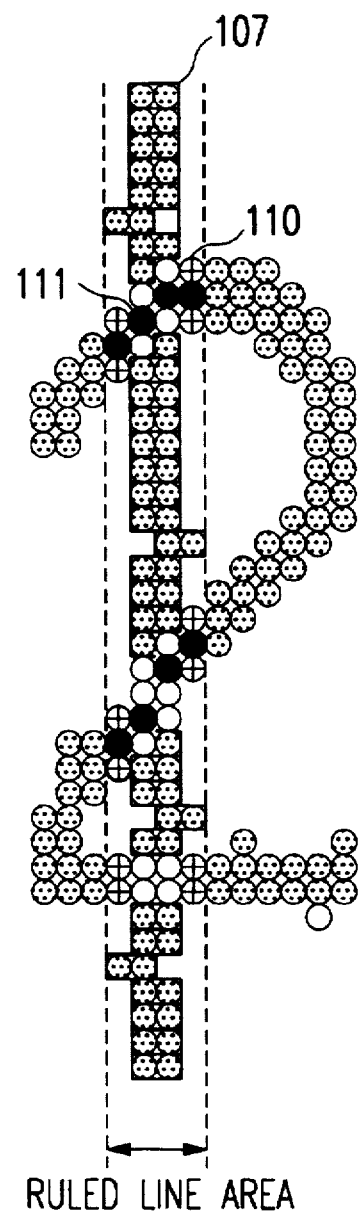
FIG. 14A is a schematic diagram of pixel image in which the ruled line overlaps the character including cut points and black pixels not to be eliminated.

After the boundary line of the input image shown in FIG. 13A is searched, the cut point 110 is determined at a dent of the boundary line in the ruled line area as shown in FIG. 14A. The cut point 110 represents a begining point or an end point to cut the ruled line.

[step 2]: cut of the ruled line

In FIG. 14A, as for the cut point 110 of left side and right side of the ruled line, a pair of the cut points is determined according to a distance between the cut points and direction of the boundary line of the character. The black pixels on connected line between the pair of the cut points are changed to the white pixels to cut the ruled line.

[step 3]: elimination of the ruled line

Figure 14B:
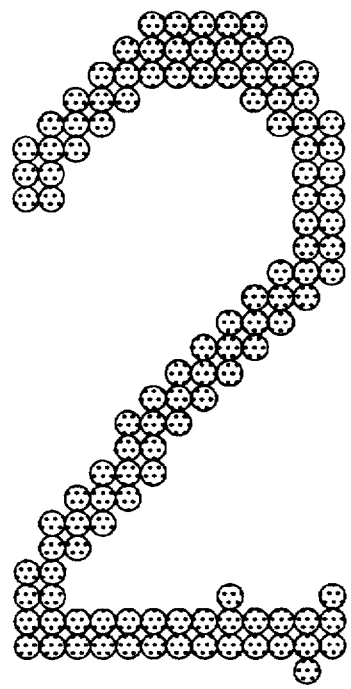
FIG. 14B is a schematic diagram of the pixel image in which the ruled line is eliminated according to the second embodiment.

In same way as method [I], the black pixels in the ruled line area are eliminated by unit of 1 line using the ruled line elimination mask 107. In this case, black pixels 111 put between upper side-boundary line (white pixels) and lower side-boundary line (white pixels) of the character are not eliminated. Then, the white pixels are changed to the black pixels again. As a result, the character which does not include the salient part and the broken part is extracted as shown in FIG. 14B.

Figure 15A:
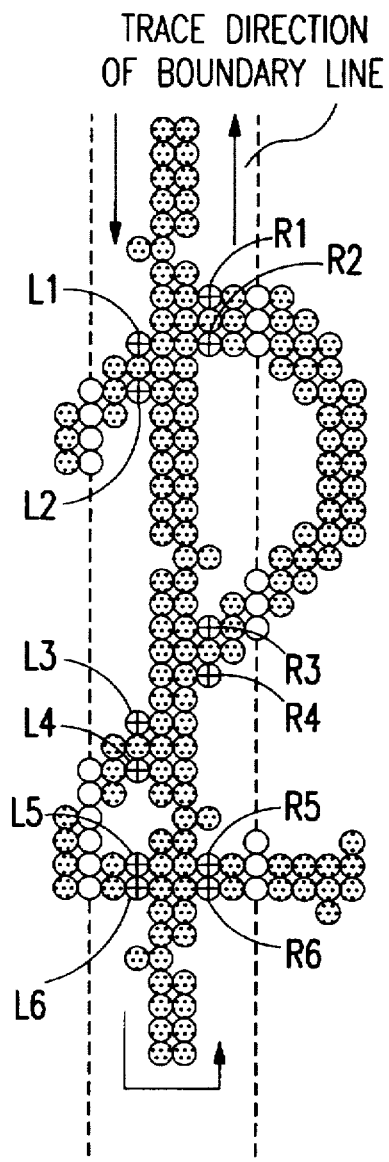
FIG. 15A is a schematic diagram of the pixel image in which the ruled line overlaps the character including left side cut points and right side cut points.
Figure 15B:
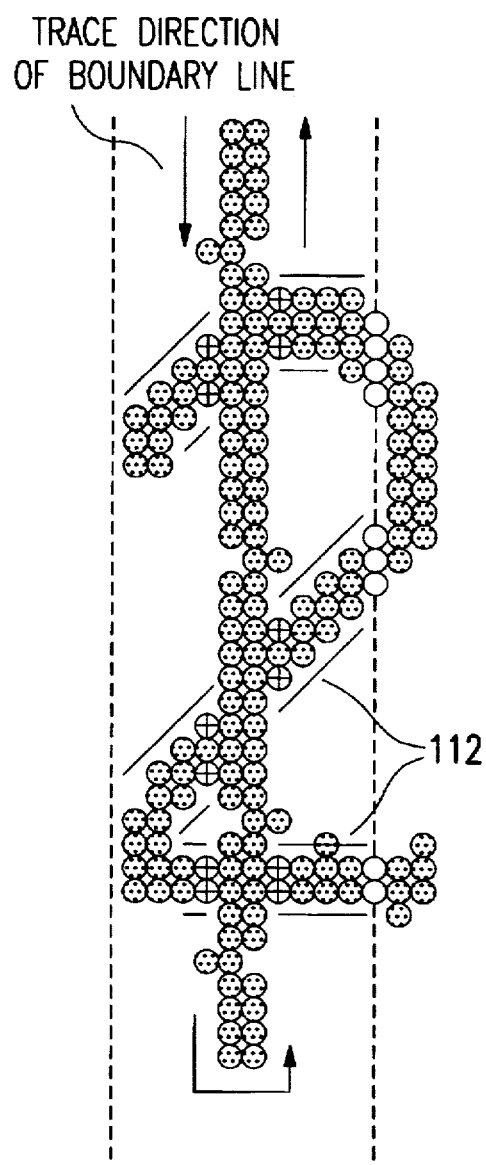
FIG. 15B is a schematic diagram of the pixel image in which boundary line of the character is traced based on the cut points.

Next, a method for determining the cut point will be explained in detail. As shown in two dotted lines of FIG. 15A, the pixel image is cut along direction of the ruled line at position of S-th pixel (in FIG. 15A, S=3) from left side and right side of the ruled line area. In short, black pixels on cut line (in FIG. 15A, on dotted line) are changed to white pixels. Next, the boundary line of pixel pattern is traced by unit of pixel. In this case, as shown in FIG. 15A, inner boundary line is not appeared in the pixel pattern by cutting as "S=3" and following processing is executed for one outer boundary line. However, in this method, it is difficult to determine direction of the boundary line 112 of the character. Therefore, as shown in FIG. 15B, the pixel image may be cut along direction of the ruled line at position of fifth pixel (S=5) from left side and right side of the ruled line area to determine the direction of the boundary line 112.

Figure 16A:
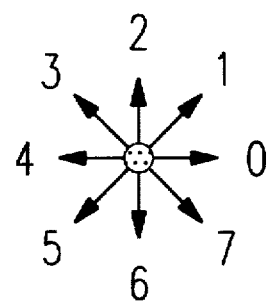
FIGS. 16A, 16B, and 16C are schematic diagrams of direction of boundary point, angle of the boundary point, and boundary line neighboring to the cut point respectively.

In tracing of the boundary line, following information is stored for each boundary point, xy-coordinates, direction of the boundary point as shown in FIG. 16A, difference of direction between each boundary point and neighboring boundary point (it is called direction difference), an approximate angle. For example, assumed that xy-coordinates of i-th boundary point is $(x_i, Y_i)$, xy-coordinate of k-th boundary point of front and rear of the i-th boundary point is $(x_{i-k}, y_{i-k}), (x_{i+k}, y_{i+k})$. In this case, the approximate angle of the i-th boundary point is calculated as follows.

approximate angle=$s \times \cos^2 \theta$

=$s \times (m \cdot n)^2 / (|m|^2 \times |n|^2)$ $m=(x_{i-k}-x_i, y_{i-k}-y_i)$ $n=(x_{i+k}-x_i, y_{i+k}-y_i)$ θ: angle between vector m and vector n S: =1(m·n>0), =−1(m·n<0)

Figure 16B:
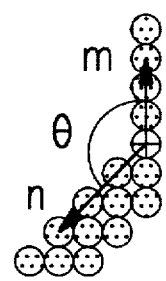
Figure 16C:
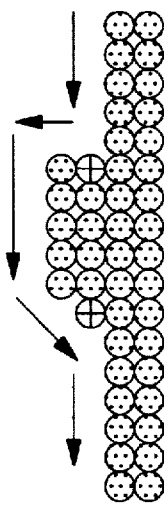

Next, the boundary points whose direction difference is negative value (in short, a dent part) is selected according to the above-mentioned information. One boundary point whose direction difference is largest among M number of the boundary points of front and rear of the one boundary point is selected as the cut point 110. For example, as shown in FIG. 16B, M number of the boundary points is four (M=4). However, in this method, it often happens that the cut point 110 on slope dent is not extracted. In this case, the cut point is determined according to following method. FIG. 16C shows an example representing move of the boundary line as arrows neighboring to the ruled line area. As shown in FIG. 16C, in neighboring to the cut point 110, it is apparent that the boundary line is apart from the ruled line toward right and left direction by at least (w+1) pixels and turns back to the ruled line. In case the boundary line is apart from the ruled line by W pixels only, it is decided that the cut point 110 does not exist in the ruled line area because the ruled line area may include binary error (in FIG. 16C, w=1). Therefore, in tracing the bondary line, when the boundary point is apart from the ruled line by two pixels, switch turns on. When the boundary point turns back to the ruled line, switch turns off. In this case, it is decided that two cut points 110 are existed between the boundary points corresponding to switch's "ON" "OFF".

In case the cut point 110 is not determined by the method shown in FIG. 16c, the first boundary point apart from the ruled line and the last boundary point back to the ruled line are the cut point 110. Even if the cut point 110 is already determined, it may be confirmed whether two cut points 110 are existed between the boundary points corresponding to switch's "ON" "OFF" and the number of the cut points 110 may be controlled. As shown in FIG. 16C, even number of the cut points 110 are existed at both side of the ruled line because the boundary line is apart from the ruled line and back to the ruled line. For example, in FIG. 15B, six cut points (L1–L6) are existed at left side of the ruled line and six cut points (R1–R6) are existed at right side of the ruled line.

Next, boundary direction 112 of the character is determined. As shown in FIG. 15B, the boundary direction 112 is the direction of the boundary line extended from the cut point 110 to the character side. The boundary line is traced by n number of pixels along direction from the cut point 110 to the character. Then, the boundary point (xj,yj) contacted with the cut point 110 or the boundary point (xj,yj) which direction difference of next boundary point is larger than a threshold is searched. The equation of a straight line using above coordinates is represented as follows.

$ax+by+c=0 (xi<yi)$ $a=yi-yj, b=xj-xi, c=xiyj-xjyi, t=-a/b$

The above coefficients a,b,c and the gradient t are stored as information of the cut point 110.

Next, in FIG. 17 and FIG. 18, a method for determining a pair of the cut points 110 will be explained. A connected line between the pair of the cut points 110 will be explained in detail. A connected line between the pair of the cut points (two points) corresponds to the boundary line of the character overlapping to the boundary line. For example, in FIG. 17A, the cut point L1 of left side of the ruled line exists on the boundary line of upper side of the character. Therefore, the cut points 110 of right side of the ruled line corresponding to the cut point L1 are R1,R3,R5. In order to determine a pair of the cut points, xy-coordinate and coefficients a,b,c of the cut point 110 are used. As a simple method, a distance between two cut points to be a pair of the cut points may be used. However, it often happens that one cut point is mistakenly corresponded to another cut point. Therefore, evaluate value including direction of the boundary line extended from the cut point 110 to the character is used to determine a suitable pair of the cut points. As shown in FIG. 17A, assumed that the cut points L1 and R1 forms a pair of the cut points and evaluate value f (L1,R1) is calculated as follows.

$$f(L1,R1)=h1^2+t\times(h2^2+h3^2)$$

provided $h1^2=(x_{L1}-x_{R1})^2+(y_{L1}-Y_{R1})^2$
$h2^2=(a_{L1}\cdot x_{R1}+b_{L1}\cdot y_{R1}+c_{L1})^2/(a^2_{L1}+b^2_{L1})$
$h3^2=(a_{R1}\cdot x_{L1}+b_{R1}\cdot y_{L1}+c_{R1})^2/(a^2_{R1}+b^2_{R1})$ $(x_{L1},y_{L1})$: xy coordinate of L1
$(x_{R1},y_{R1})$: xy coordinate of R1
$a_{L1},b_{L1},c_{L1}$: boundary direction of L1
$a_{R1},b_{R1},c_{R1}$: boundary direction of R1
h1: a distance between two cut points (shown in FIG. 17B)
h2,h3: a distance between a straight line of the boundary line of one cut point and the other cut point (shown in FIG. 17B)

Figure 18A:
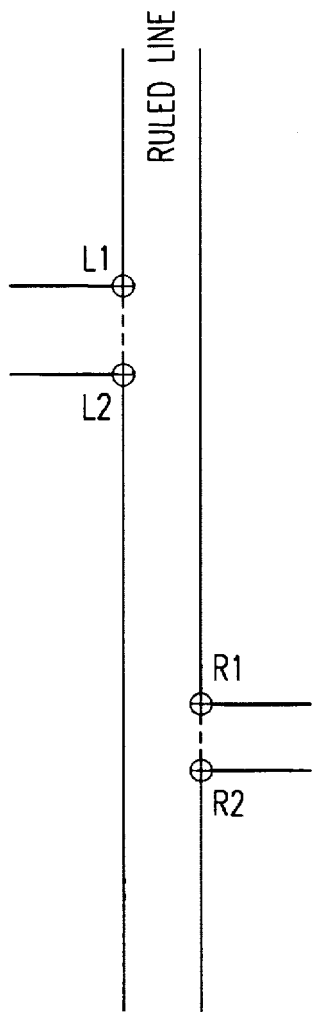
FIGS. 18A, 18B, and 18C are schematic diagrams of three examples of a part of a cut point which does not correspond to another pair of cut points.

Combination of two cut points whose evaluate value is smallest is a suitable pair of the cut points 110. In FIG. 17A, six pairs of the cut points (L1,R1) (L2,R2) (L3,R3) (L4,R4) (L5,R5) (L6,R6) are determined. In FIG. 17C, four cut points (U1~U4) are existed at upper side of the ruled line and two cut points (D1,D2) are existed at lower side of the ruled line. In this case, two pairs of the cut points (U1,D1) (U4,D2) are determined using the above mentioned method. However, two cut points U2,U3 do not correspond to other cut points. This representative example will be explained in detail. First, in FIG. 18A, assumed that the cut points L1,R1 on boundary line of upper side of the ruled line and the cut points L2,R2 on boundary line of lower side of the ruled line are not corresponded each other. As shown in FIG. 18A, the cut point L1 is near to the cut point L2 on left side and the cut point R1 is near to the cut point R2 on right side. In case one pair of cut points exists on one side of the ruled line, (L1,L2) (R1,R2) are two pairs of cut points respectively. In case plural pairs of cut points exist on one side of the ruled line and one pair of the cut points are apart from the other pair of the cut points, (L1,L2) (R1,R2) are also two pairs of cut points.

Figure 18B:
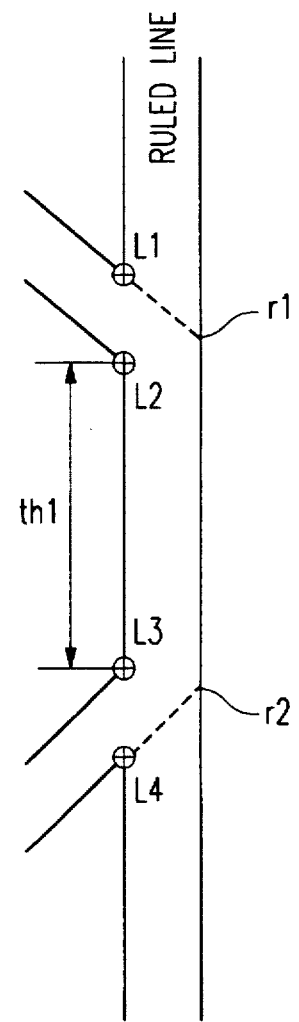

Next, as shown in FIG. 18B, plural pairs of two cut points (L1,L2),(L3,L4) exist on same side of the ruled line, a distance between two cut points L2,L3 near to each other is calculated. If the distance the is below a threshold and straight lines of boundary directions of each cut point crosses to the ruled line, the boundary directions of the other two cut points L1,L4 are extended to the other side of the ruled line. Two cross points r1,r2 are temporary cut points. In this case, (L1,r1) (L4,r2) are each a pair of cut points and two cut points L2,L3 are included in these pairs of the cut points.

Figure 18C:
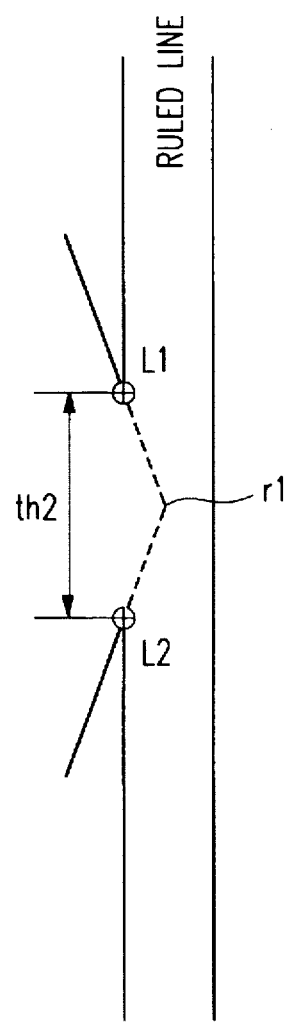

As shown in FIG. 18C, in case a distance between two cut points (L1,L2) is above a threshold and each straight line of the boundary direction of the cut points (L1,L2) crosses the ruled line, the cross point r1 is temporary cut point r1. In FIG. 18C, (L1,r1) (L2,r2) are two points of the cut points.

After a pair of the cut points is determined, elimination of the ruled line is executed. Two cut points being a pair of the cut points are connected by a straight line. If correspondence of pair of the cut points is correct, the connected line exists mutually on upper side-boundary line and lower side-boundary line of the character. Next, black pixals on the connected line are changed to white pixels and the ruled line is eliminated by the ruled line elimination mask according to the ruled line elimination method [I]. In this case, black pixels between two connected lines on upper side-boundary line and lower side-boundary line are not eliminated. Then, the white pixels changed from the black pixels on the connected line are rechanged to the black pixels. As a result, the character whose boundary line is smooth is extracted as shown in FIG. 14B.

Figure 19:
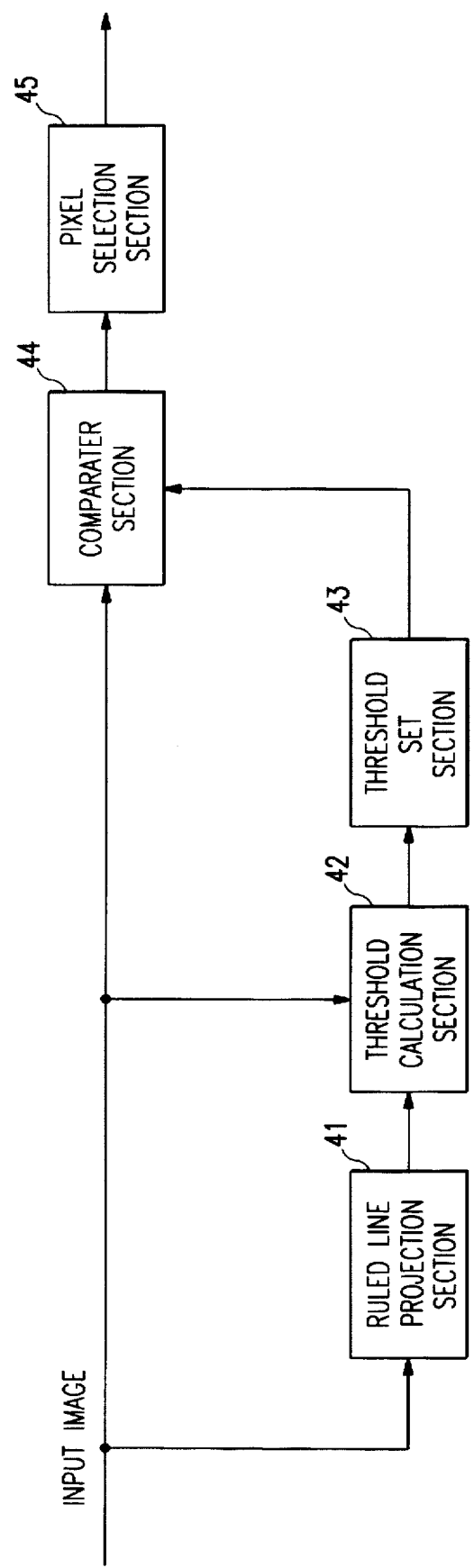
FIG. 19 is a block diagram of the ruled line elimination section of a third embodiment of the present invention.
Figure 20B:
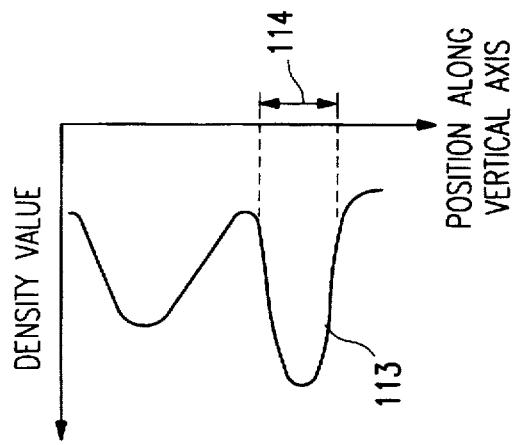
FIG. 20B is a schematic diagram of projection of density value of pixel in the multivalued image to a vertical direction.
Figure 20A:
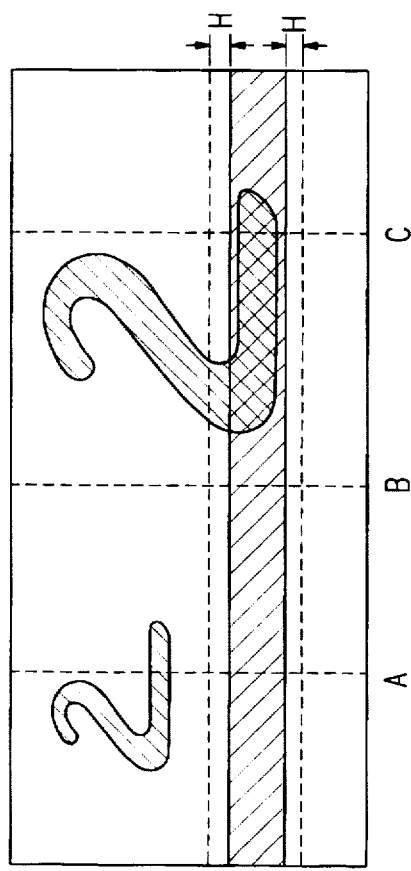
FIG. 20A is a schematic diagram of an example of multivalued image including the characters and the ruled line.
Figure 20C:
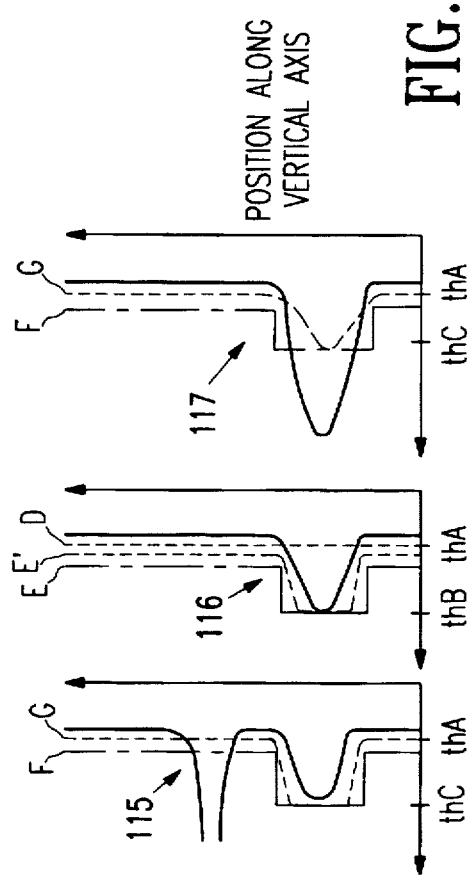
FIG. 20C is a schematic diagram of density distribution and threshold curve for three section position of the multivalued image.
Figure 21A:
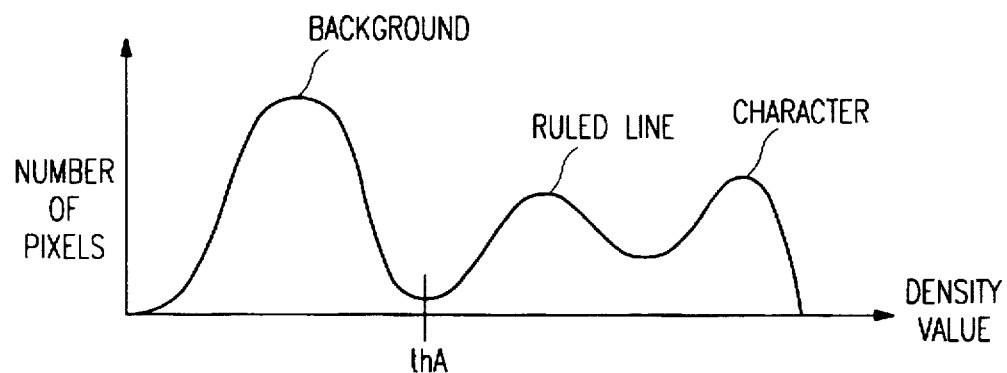
FIGS. 21A and 21B are schematic diagrams of distribution of number of pixels for density of the multivalued image.
Figure 21B:
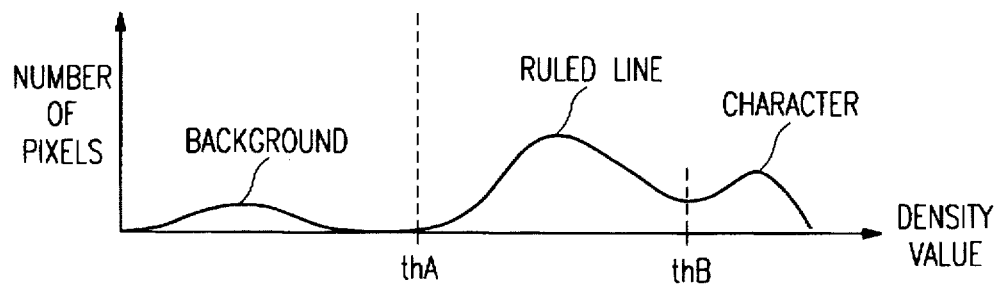
Figure 22:
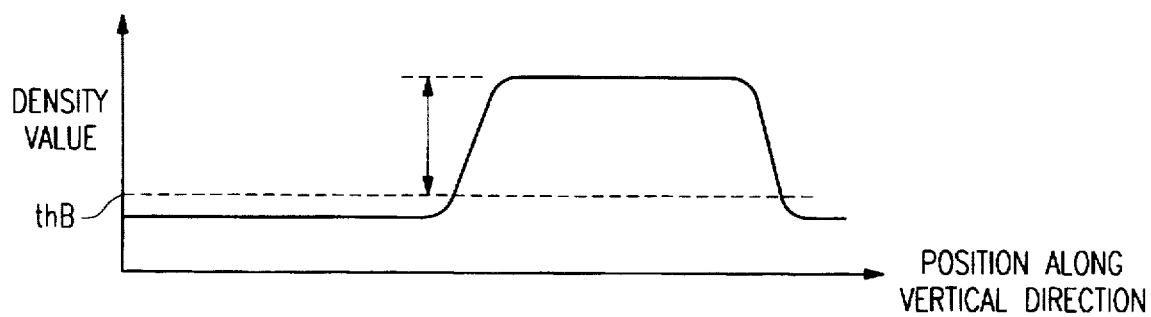
FIG. 22 is a schematic diagram of distribution of density value of pixels for the ruled line in the multivalued image.

(3) the ruled line elimination method for multivalued image:

The ruled line elimination method for multivalued images will be explained by referring to FIG. 19~25. In this method, the position of the ruled line of the input image is decided and binary threshold neighboring to the ruled line is controlled to be different from binary threshold of other part of the input image. Therefore, the ruled line is eliminated even if difference between density of the character and density of the ruled line is small. FIG. 19 is a block diagram of the ruled line elimination apparatus for multivalued image according to the present invention. A ruled line projection section 41 calculates projection of pixel values of the input image to vertical direction to decide position of the ruled line. A threshold calculation section 42 calculates histogram of number of pixels for density value of the input image according to the position of the ruled line. Then, the threshold calculation section 42 calculates first threshold corresponding to the ruled line and second threshold corresponding to the other part according to figure of the histogram. A threshold set section 43 sets the first threshold and the second threshold corresponding to pixel position of the image. A comparater section 44 compares pixel value of the ruled line with the first threshold and compares pixel value of the other part with the second threshold. A pixel selection section 45 outputs pixel value of the input image in case the pixel value is above the threshold. Each processing of the ruled line elimination method for the multivalued image will be explained in detail. FIG. 20 A is an example of the multivalued image including the characters and the ruled line. In this case, white pixel value is "0". First, smoothing is executed to the multivalued image to correct error of quantization of each pixel value. In smoothing by filtering, density value of each pixel and neighboring pixel are multiplied by weight and the multiplication result is density value of each pixel. After smoothing, in case of the ruled line of horizontal direction, density value of each pixel of the image is projected (accumulated) toward horizontal direction. In case of the ruled line of vertical direction, density value of each pixel of the image is projected (accumulated) toward vertical direction. As shown in FIG. 20A, the ruled line exists along horizontal direction. Therefore, the density value of each pixel of the image is accumulated toward horizontal direction. FIG. 20B shows projection 113 of density value toward horizontal direction. Each density value of projection 113 corresponds to pixel position along vertical axis. In figure of the projection 113, area whose density value is above threshold is decided to be position 114 of the ruled line. FIG. 20C shows distribution of density value (density distribution) corresponding to three sections A,B,C along vertical direction in FIG. 20A and threshold curve to separate the ruled line from the character. On the otherhand, the binary threshold to separate the background from the other part is calculated according to the density distribution of all pixels of the image. FIG. 21A shows distribution of number of pixels for density value of all pixels of the image. The horizontal axis represents density value and the vertical axis represents number of pixels by unit of density value. The threshold (thA) is determined as a boundary point between background part and ruled line part as shown in FIG. 21A. A center histogram in FIG. 20C includes binary threshold curve D according to the threshold (thA). Next, in FIG. 20B, both side of the ruled line position 114 is respectively extended by H number of pixels to be existence area of the ruled line as shown in FIG. 20A. In the existence area of the ruled line, density value of pixel is accumulated along vertical direction as shown in FIG. 22. In FIG. 22, the vertical axis represents pixel position corresponding to the image of FIG. 20A. The horizontal axis represents density value by unit of pixel position. In case difference between density of the character and density of the ruled line is large, density of part on which the character overlaps to the ruled line is larger than density of part on which the character does not overlap the ruled line. In short, as shown in FIG. 22, the histogram of the density value includes difference being above threshold. Therefore, a binary threshold (thB) is determined according to the density value of part on which the character does not overlap the ruled line. FIG. 21B shows distribution of number of pixels for density value in the existence area of the ruled line. In same way of FIG. 21A, the horizontal axis represents the density value and the vertical axis represents the number of pixels by unit of the density value. After determining threshold (thB), the threshold curve E of salient type is calculated, in which the threshold (thB) is used for pixel position of the ruled line and the threshold (thA) is used for pixel position of the other part (thA<thB). The threshold curve E is shown in center histogram 116 of FIG. 20C. On the other hand, the difference of density of the character and the ruled line is not included in histogram of FIG. 22, following processing is executed. As shown in density distribution 115 of section A and density distribution 117 of section C of FIG. 20C, it is not always that density value of all pixels of the ruled line and the character are equal. As for the ruled line, it often happens that density value of pixel is gradually reduced from center part of the ruled line to edge part of the ruled line. Therefore, binary threshold (thB) is calculated using density value of pixel of the center part of the ruled line.

Figure 23:
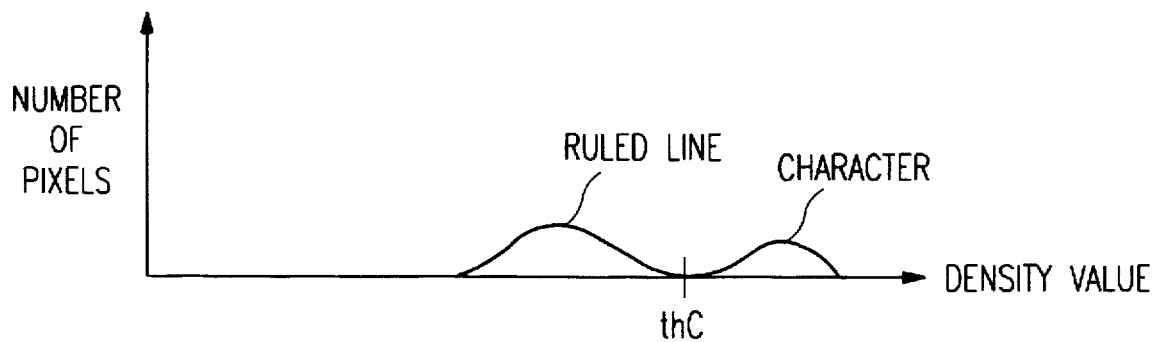
FIG. 23 is a schematic diagram of distribution of number of pixels for center part of the ruled line.

FIG. 23 shows histogram of number of pixels for density value of the center part of the ruled line. In comparison with threshold (thB) of FIG. 21B, a boundary line (threshold (thC)) between the character and the ruled line is clearly appeared in the histogram because density value of pixel of the center part of the ruled line is only accumulated. In density distribution 115 of section A and density distribution 117 of section C of FIG. 20C, the threshold curve F of salient type is shown, in which the threshold (thC) is used for pixel position of the ruled line and the threshold (thA) is used for pixel position of the other part.

Figure 24:
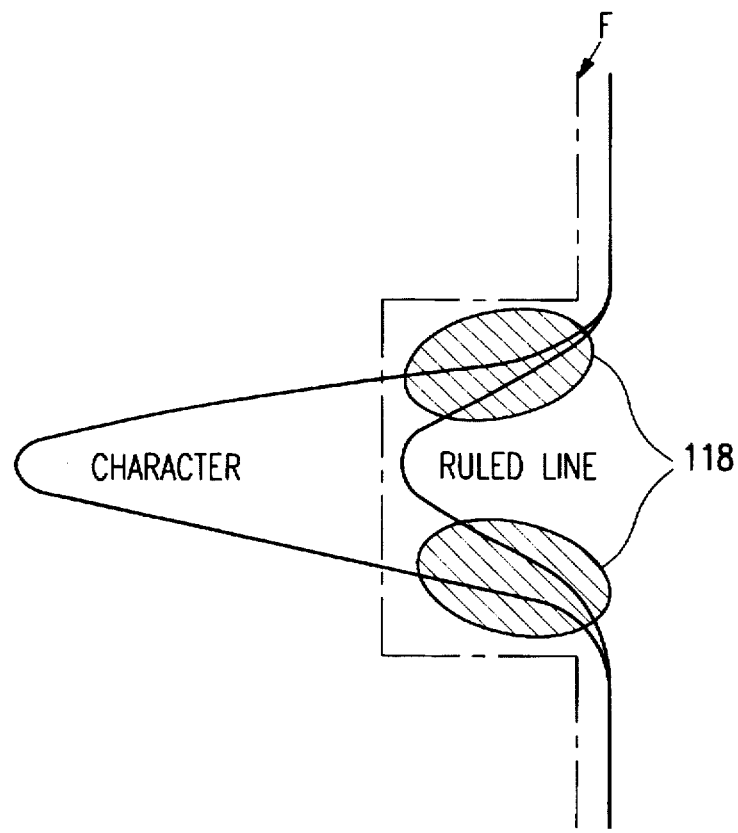
FIG. 24 is a schematic diagram of distribution of a density of pixels for a predetermined position.

As the above-mentioned, it often happens that density value of pixel of the ruled line is gradually reduced from center part of the ruled line to edge part of the ruled line. Especially, in case density value of the character part overlapping to edge part of the ruled line is below the threshold (thC), it happens that the character part is mistakenly eliminated because of the threshold (thC). FIG. 24 shows magnification histogram neighboring to the ruled line of the density distribution 117 of section C. As shown in FIG. 24, density value of the character part in oblique line 118 is below the threshold line F and the character part in the oblique line 118 is eliminated. Therefore, the threshold line F neighboring to the boundary line of the ruled line is inclined so that the density value of the character part might not be below the threshold line F.

Figures 25A, 25B:
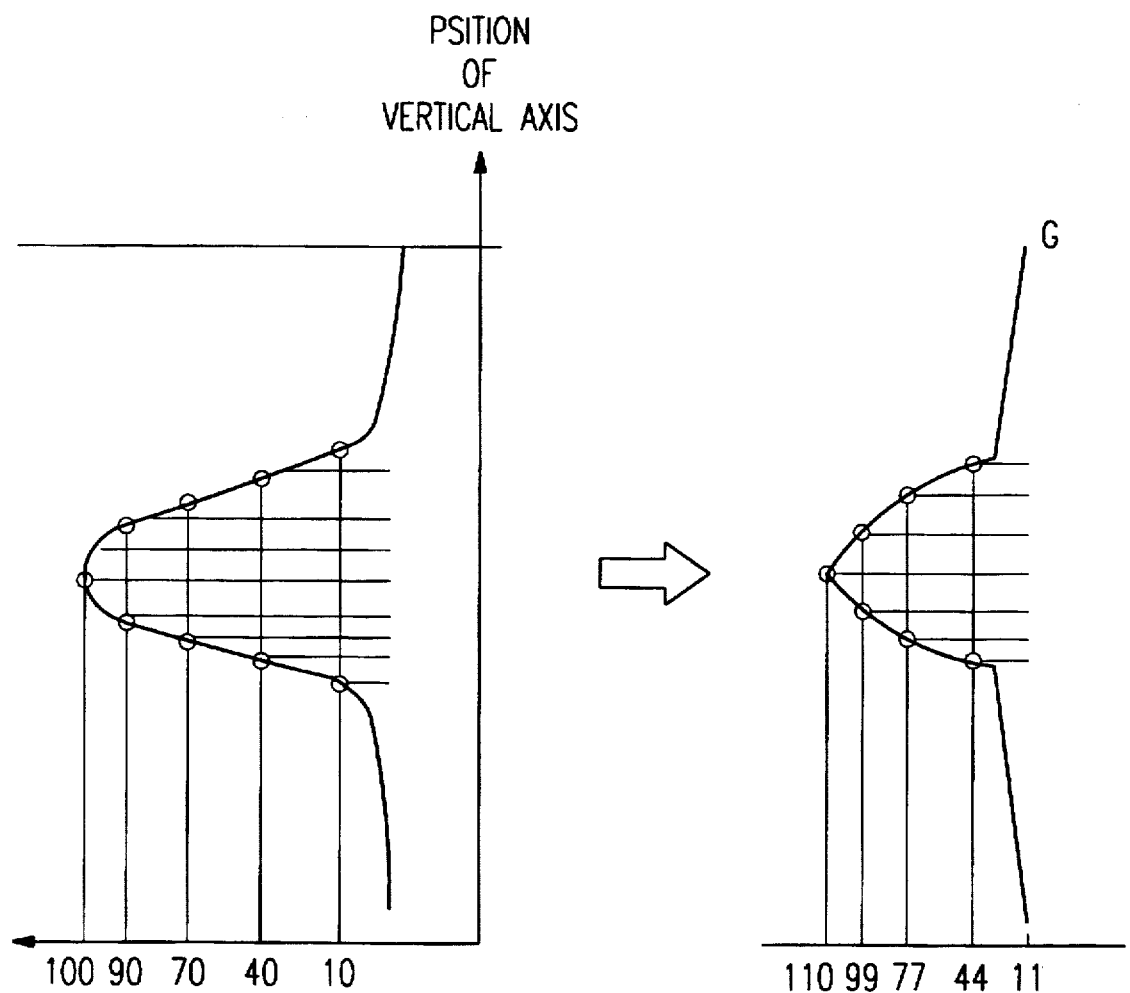
FIGS. 25A and 25B are schematic diagrams of method for determining inclination applied for the threshold curve.

Threshold curve G calculated by this method is shown in density distribution 117 of section C of FIG. 20C. The method for calculating the threshold curve G will be explained in detail. As shown in FIG. 25A, assumed as follows.

(estimation width of the ruled line)+2H=9

(density value of pixel of the ruled line)=10,40,70,90,100, 90,70,40,10 thC=110

In this case, as shown in FIG. 25B, density value of salient part of the threshold curve G is changed in proportion to density distribution of section C of the ruled line. In short, density values of pixel of the threshold curve G are "11,44, 77,99,110,99,77,44,11". In this way, the salient part of the threshold curve G corresponding to edge part of the ruled line is inclined.

Furthermore, this method is applied for the threshold curve E of salient type of section B in FIG. 20C. The threshold curve E' in which edge part is inclined is shown in density distribution 116 of FIG. 20C.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A ruled line elimination apparatus for eliminating a ruled line from an input binary image including characters and the ruled line, comprising:

determination means for determining an existence area of the ruled line in the input image, the existence area including at least one character contacting the ruled line; and elimination means for eliminating continuous pixels constituting the ruled line apart from the character in the existence area using a mask having a predetermined width perpendicular to the direction of the ruled line, wherein the predetermined width corresponds to a width of the ruled line.

2. The ruled line elimination apparatus according to claim 1, further including a part image indication means for indicating a part of the input image in which a character contacts the ruled line, wherein said elimination means eliminates the continuous pixels constituting the ruled line apart from the character in the part of the input image.

3. A ruled line elimination apparatus for eliminating a ruled line from an input binary image including characters and the ruled line, comprising:

determination means for determining an existence area of the ruled line in the input image, the existence area including at least one character contacting the ruled line; and elimination means for cutting the ruled line contacting the character along a direction of a boundary line of the character extending from the ruled line to the pair of points where the character boundary line and ruled line intersect in the existence area, and for eliminating continuous pixels constituting the cut ruled line portion apart from the character in the existence area using a mask having a predetermined width perpendicular to the direction of the ruled line, wherein the predetermined width corresponds to a width of the ruled line.

4. The ruled line elimination apparatus according to claim 3, wherein said elimination means sets a cut point of a left side pixel and a right side pixel neighboring the ruled line along the boundary line of the character and traces the direction of the boundary line of the character from the cut point of the left side and the ruled line.

5. The ruled line elimination apparatus according to claim 4, wherein said elimination means determines a correspondence between two cut points of both sides neighboring the ruled line in accordance with a distance between the two cut points, and a distance from one cut point in a direction extended by the other cut point along the boundary line of the character.

6. The ruled line elimination apparatus according to claim 5, wherein said elimination means converts black pixels on a line connected by the two cut points to white pixels, and reconverts the white pixels to black pixels after the continuous pixels of the cut-ruled line are eliminated.

7. The ruled line elimination apparatus according to claim 5, wherein said elimination means determines a correspondence between two cut points of one side neighboring to the ruled line in accordance with a distance between the two cut points and a cross point extended from the two cut points along the boundary line.

8. A ruled line elimination apparatus for eliminating a ruled line from a multivalued input image comprised of pixels, the image including characters and the ruled line which at least one character overlaps, comprising:

set means for setting a first threshold to the area except for the ruled line area and a second threshold to the ruled line area along a direction perpendicular to the direction of the ruled line in the input image, wherein the first threshold is determined as a boundary value between the density of the background and the density of the other parts in the input image, the second threshold is determined as a boundary value between the density of the ruled line and the density of the character in the ruled line area, and the second threshold is higher than the first threshold; and elimination means for comparing each pixel value of the input image with the threshold value corresponding to the pixel position, and for eliminating the pixel from the input image if the pixel value is lower than the corresponding threshold value.

9. The ruled line elimination apparatus according to claim 8, further including a projection means for projecting a density value of each pixel to a corresponding position along the direction perpendicular to the ruled line, and for detecting the ruled line area in accordance with salient figure of the projected value along the direction.

10. The ruled line elimination apparatus according to claim 9, further including calculation means for counting the number of pixels for each pixel value of the input image by unit of density value, and for detecting first threshold as a boundary point between background salient figure and ruled line salient figure of counted number.

11. The ruled line elimination apparatus according to claim 10, wherein said calculation means calculates the sum of density value for each pixel value of the ruled line area by unit of pixel position along a direction of the ruled line, and for detecting second threshold in accordance with salient figure of the sum of density in which the character overlaps the ruled line.

12. The ruled line elimination apparatus according to claim 11, wherein said set means sets the second threshold to pixel position of the ruled line area and sets the first threshold to pixel position of the other area of the input image.

13. The ruled line elimination apparatus according to claim 11, wherein said calculation means counts number of pixels for each pixel value of a center line of the ruled line area by unit of pixel position along a direction of the ruled line in case the second threshold is not calculated, and detects third threshold as a boundary point between ruled line salient figure and character salient figure of counted number.

14. The ruled line elimination apparatus according to claim 13, wherein said set means sets the third threshold to pixel position of the ruled line area and sets the first threshold to pixel position of the other area of the input image.

15. The ruled line elimination apparatus according to claim 8, wherein value of the plurality of threshold is gradually reduced from pixel position of center of the ruled line to pixel position of edge part of the ruled line.

16. A ruled line elimination apparatus for eliminating a ruled line from an input image including characters and the ruled line which at least one character overlaps, comprising:

decision means for deciding whether the input image is a binary valued image or a multivalued image;

calculation means for calculating the density difference between the ruled line and the character in the input image in case the input image is decided to be a multivalued image;

selection means for (a) selecting a program of elimination for a binary image in case the input image is decided to be a binary image or in case the input image is decided to be a multivalued image and the calculated density difference is less than or equal to a threshold, or (b) selecting a program of elimination for a multivalued image in case the input image is decided to be a multivalued image and the density difference is larger than a threshold; and elimination means for eliminating the ruled line from the input image in accordance with the selected program of elimination.

17. The ruled line elimination apparatus according to claim 16, wherein said selection means selects the program of elimination for binary image in case the density difference is not larger than the threshold, and wherein said elimination means converts the input image from the multivalued image to the binary image.

18. The ruled line elimination apparatus according to claim 16, wherein said elimination means executes elimination-processing in accordance with each program of elimination, and outputs an elimination result and a confidence value corresponding to each program of elimination, wherein the elimination result whose confidence value is highest is selected.

19. The ruled line elimination apparatus according to claim 18, wherein said elimination means executes elimination-processing in accordance with a first program of elimination, selects the first elimination result if the first confidence value is above a threshold, and executes elimination-processing in accordance with the next program of elimination if the first confidence value is not above the threshold.

20. A method for eliminating a ruled line from an input binary image including characters and the ruled line, comprising the steps of:

determining an existence area of the ruled line in the input image, the existence area including at least one character contacting the ruled line; and eliminating continuous pixels constituting the ruled line apart from the character in the existence area using a mask having a predetermined width perpendicular to the direction of the ruled line, wherein the predetermined width corresponds to a width of the ruled line.

21. A method for eliminating a ruled line from an input binary image including characters and the ruled line, comprising the steps of:

determining an existence area of the ruled line in the input image, the existence area including at least one character contacting the ruled line;

cutting the ruled line contacting the character along a direction of a boundary line of the character extending from the ruled line to the pair of points where the character boundary line and ruled line intersect in the existence area; and eliminating continuous pixels constituting the cut ruled line portion apart from the character in the existence area using a mask having a predetermined width perpendicular to the direction of the ruled line, wherein the predetermined width corresponds to a width of the ruled line.

22. A method for eliminating a ruled line from a multivalued input image comprised of pixels, the image including characters and the ruled line which at least one character overlaps, comprising the steps of:

setting a first threshold to the area except for the ruled line area and a second threshold to the ruled line area along a direction perpendicular to the direction of the ruled line in the input image, wherein the first threshold is determined as a boundary value between the density of the background and the density of the other parts in the input image, the second threshold is determined as a boundary value between the density of the ruled line and the density of the character in the ruled line area, and the second threshold is higher than the first threshold;

comparing each pixel value of the input image with the threshold value corresponding to the pixel position; and eliminating the pixel from the input image if the pixel value is lower than the corresponding threshold value.

23. A method for eliminating a ruled line from an input image including characters and the ruled line which at least one character overlaps, comprising the steps of:

deciding whether the input image is a binary valued image or a multivalued image;

calculating the density difference between the ruled line and the character in the input image in case the input image is decided to be a multivalued image;

selecting a program of elimination for a binary image in case the input image is decided to be a binary image, or in case the input image is decided to be a multivalued image and the calculated density difference is less than or equal to a threshold;

selecting a program of elimination for a multivalued image in case the input image is decided to be a multivalued image and the density difference is larger than a threshold; and eliminating the ruled line in the input image in accordance with the selected program of elimination.

24. A computer readable memory containing computer-readable instructions, comprising:

instruction means for causing a computer to determine an existence area of a ruled line in an input binary image, the existence area including at least one character contacting the ruled line; and instruction means for causing a computer to eliminate continuous pixels constituting the ruled line apart from the character in the existence area using a mask having a predetermined width perpendicular to the direction of the ruled line, wherein the predetermined width corresponds to a width of the ruled line.

25. A computer readable memory containing computer-readable instructions, comprising:

instruction means for causing a computer to determine an existence area of a ruled line in an input binary image, the existence area including at least one character contacting the ruled line;

instruction means for causing a computer to cut the ruled line contacting the character along a direction of a boundary line of a character extended from the ruled line to the pair of points where the character boundary line and ruled line intersect in the existence area; and instruction means for causing a computer to eliminate continuous pixels constituting the cut ruled line portion apart from the character in the existence area using a mask having a predetermined width perpendicular to the direction of the ruled line, wherein the predetermined width corresponds to a width of the ruled line.

26. A computer readable memory containing computer-readable instructions for eliminating a ruled line from a multivalued input image comprised of pixels, the image including characters and the ruled line which at least one character overlaps, comprising:

instruction means for causing a computer to set a first threshold to the area except for the ruled line area and a second threshold to the ruled line area along a direction perpendicular to the direction of the ruled line in the input image, wherein the first threshold is determined as a boundary value between the density of the background and the density of the other parts in the input image, the second threshold is determined as a boundary value between the density of the ruled line and the density of the character in the ruled line area, and the second threshold is higher than the first threshold;

instruction means for causing a computer to compare each pixel value of the input image with the threshold value corresponding to the pixel position; and instruction means for causing a computer to eliminate the pixel from the input image if the pixel value is lower than the corresponding threshold value.

27. A computer readable memory containing computer-readable instructions, comprising:

instruction means for causing a computer to decide whether the input image is a binary valued image or a multivalued image;

instruction means for causing a computer to calculate the density difference between the ruled line and the character in the input image in case the input image is decided to be a multivalued image;

instruction means for causing a computer to select a program of elimination for a binary image in case the input image is decided to be a binary image, or in case the input image is decided to be a multivalued image and the calculated density difference is less than or equal to a threshold;

instruction means for causing a computer to select a program of elimination for a multivalued image in case the input image is decided to be a multivalued image and the density difference is larger than a threshold; and instruction means for causing a computer to eliminate the ruled line in accordance with the selected program of elimination.

28. The ruled line elimination apparatus according to claim 1, wherein said mask has a predetermined width substantially equal to the width of the ruled line.

29. The ruled line elimination apparatus according to claim 28, wherein said mask is scanned on continuous pixels along the direction of the ruled line to be eliminated.

30. The ruled line elimination apparatus according to claim 3, wherein said mask has a predetermined width substantially equal to the width of the ruled line.

31. The ruled line elimination apparatus according to claim 29, wherein said mask is scanned on continuous pixels along the direction of the ruled line to be eliminated.

32. The ruled line elimination method according to claim 20, wherein said mask has a predetermined width substantially equal to the width of the ruled line.

33. The ruled line elimination method according to claim 32, wherein said mask is scanned on continuous pixels along the direction of the ruled line to be eliminated.

34. The ruled line elimination method according to claim 21, wherein said mask has a predetermined width substantially equal to the width of the ruled line.

35. The ruled line elimination method according to claim 34, wherein said mask is scanned on continuous pixels along the direction of the ruled line to be eliminated.

36. The computer readable memory according to claim 24, wherein said mask has a predetermined width substantially equal to the width of the ruled line.

37. The computer readable memory according to claim 36, wherein said mask is scanned on continuous pixels along the direction of the ruled line to be eliminated.

38. The computer readable memory according to claim 25, wherein said mask has a predetermined width substantially equal to the width of the ruled line.

39. The computer readable memory according to claim 38, wherein said mask is scanned on continuous pixels along the direction of the ruled line to be eliminated.

* * * * *